(12) United States Patent
Pacala (10) Patent No.: US 8,466,670 B1
(45) Date of Patent: Jun. 18, 2013

(54) PULSED POWER SUPPLY

(75) Inventor: Viorel M. Pacala, Mount Laurel, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 99 days.

(21) Appl. No.: 13/091,567

(22) Filed: Apr. 21, 2011

(51) Int. Cl.
*G05F 1/00* (2006.01)

(52) U.S. Cl.
USPC .............................. 323/288; 320/166; 363/60

(58) Field of Classification Search
USPC .................. 323/273–288; 320/166; 363/60
See application file for complete search history.

(56) References Cited

U.S. PATENT DOCUMENTS

| | | | |
|---|---|---|---|
| 4,325,021 A * | 4/1982 | McMackin | 323/351 |
| 4,326,245 A * | 4/1982 | Saleh | 363/79 |
| 4,967,138 A * | 10/1990 | Obergfell et al. | 323/224 |
| 6,631,064 B2 * | 10/2003 | Schuellein et al. | 361/93.1 |
| 7,596,006 B1 | 9/2009 | Granat | |
| 7,633,320 B2 * | 12/2009 | Yamamoto et al. | 327/60 |
| 7,656,141 B1 | 2/2010 | Granat | |
| 7,852,059 B2 * | 12/2010 | Ishii et al. | 323/284 |
| 7,969,128 B2 | 6/2011 | Granat | |
| 8,068,354 B2 * | 11/2011 | Wang et al. | 363/21.09 |
| 2001/0038279 A1 * | 11/2001 | Jaworski | 323/288 |
| 2009/0073011 A1 * | 3/2009 | Trifonov et al. | 341/118 |
| 2010/0164391 A1 * | 7/2010 | Bea et al. | 315/224 |
| 2010/0253308 A1 * | 10/2010 | Chiang | 323/283 |
| 2012/0126766 A1 * | 5/2012 | Chen | 323/283 |
| 2012/0206122 A1 * | 8/2012 | Dhuyvetter et al. | 323/311 |

* cited by examiner

*Primary Examiner* — Jue Zhang
*Assistant Examiner* — Kyle J Moody
(74) *Attorney, Agent, or Firm* — Howard IP Law Group, PC (57) ABSTRACT

A power supply for a gated load includes a power current source controlled by a current magnitude signal. A capacitor integrates the power current to produce load voltage. The power current is sampled, and compared with a reference voltage appearing across a reference capacitor, to produce the current magnitude signal. The reference voltage is controlled by a window comparator which charges the reference capacitor when the load voltage exceeds an upper threshold, and discharges the reference capacitor when the load voltage is less than a lower threshold. The window comparator is enabled by the load gating signal.

7 Claims, 5 Drawing Sheets

| V out 319 | Higher then 29V | | 28V to 29V | | Less then 28V | |
|---|---|---|---|---|---|---|
| STYM | High | Low | High | Low | High | Low |
| 352₁₇ | High | Low | Low | Low | Low | Low |
| 352₂₇ | Low | Low | Low | Low | High | Low |
| Vref333 | ↗ | unchanged | unchanged | unchanged | unchanged | unchanged |
|  | unchanged | unchanged | unchanged | unchanged | ↘ | unchanged |
| Iout310 | ↘ |  |  |  | ↗ |  |

FIG. 5

PULSED POWER SUPPLY

BACKGROUND

Modern radar systems use solid-state devices because of their reliability. Solid-state devices are not only reliable, but operate at relatively low voltages by comparison with traditional vacuum tube devices, including such devices as magnetrons and klystrons. It is well known that radar systems, of whatever type, may require substantial transmitter power for generating electromagnetic signals capable of traversing the path between the transmitter and the target, being reflected, and returning to the radar system with sufficient amplitude to be detected in the presence of unavoidable system noise. Thus, the transmitter of a solid-state radar system may require substantial power at relatively low voltage.

Radar systems often operate in a pulse mode. Thus, a solid-state radar system may require pulsed power at relatively low voltage. The power supply for a radar transmitter is often a power source such as, for example, a constant-voltage source together with an inductance-capacitance (LC) filter or energy storage circuit which matches the pulse load with the average-power source.

Figure 1:
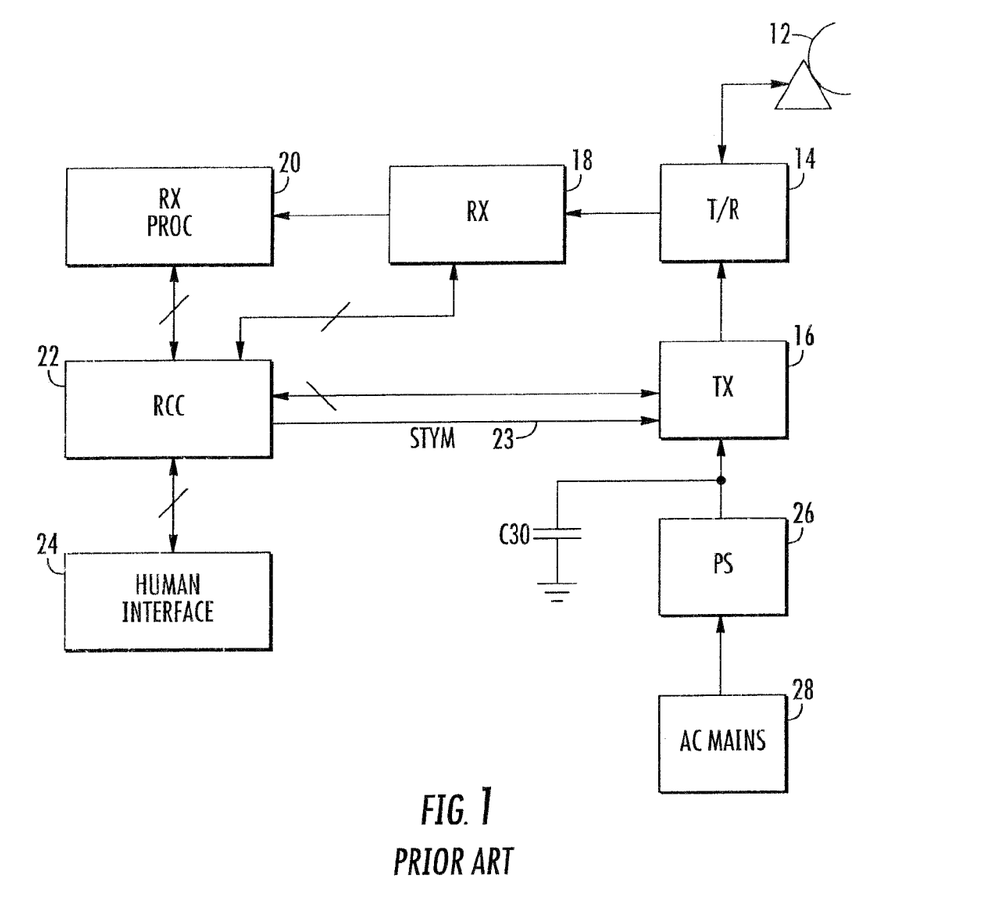
FIG. 1 is a simplified block diagram of a prior art radar system, which radar system includes a transmitter.

In FIG. 1, a radar system 10 includes an antenna designated 12, coupled to a transmit/receive (T/R) device 14. A transmitter 16 and an analog receiver 18 are coupled to the transmit-receive device 14. Receiver 18 processes received reflected radar signals, and couples the processed analog signals to a digital processing arrangement illustrated as a block 20. A radar control computer (RCC) 22 is coupled to the transmitter 16, receiver 18, and to receive processor 20, for interacting with and synchronizing the various different portions of the radar system. A human interface illustrated as a block 24 represents controls for setting the various modes of operation of the radar, and for displaying radar information, as for example a plan-position indicator, all as well known in the radar arts. As illustrated in FIG. 1, a power supply (PS) 26 receives mains 28 power, and is connected for supplying power to the transmitter 16 and a capacitor C30.

Figure 2:
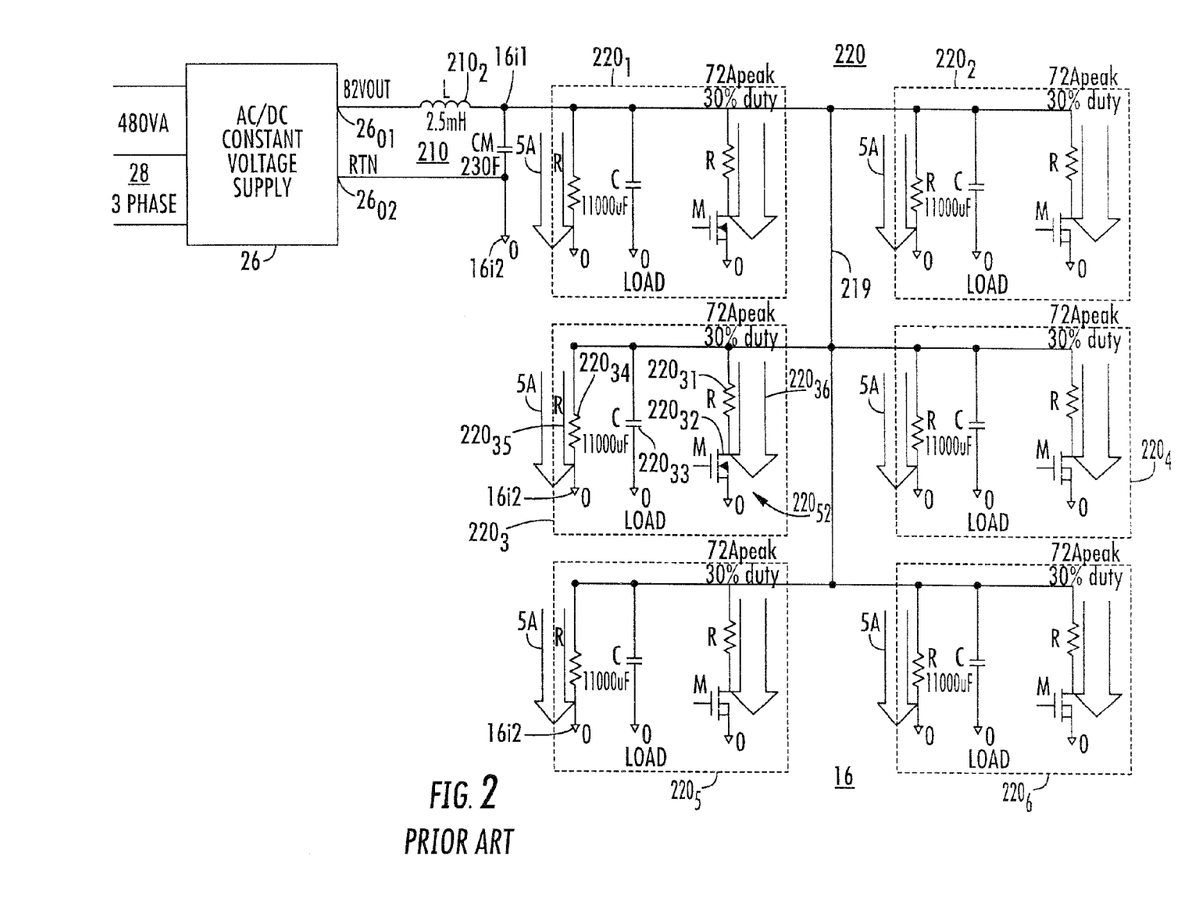
FIG. 2 is a simplified diagram notionally illustrating the equivalent circuit represented by a portion of the power supply and the transmitter of FIG. 1.

FIG. 2 illustrates an equivalent circuit representing the prior-art transmitter 16 and its connections to the power supply 26. In FIG. 2, 3-phase, 480 volt power is applied from mains 28 to the power supply 26. Power supply 26 is a constant-voltage supply, which may be energized from either and alternating-current (AC) or direct-current (DC) source. As illustrated, the output of power supply 26 is 32 volts direct (also known as direct current or DC) at an output node, port or terminal $26_{O1}$ relative to return node, port or terminal $26_{O2}$. Return terminal $26_{O2}$ is connected to the ground of transmitter 16, represented by conventional ground symbols, some of which are designated $16i2$.

In FIG. 2, output terminal $26_{O1}$ of power supply 26 is connected by an energy storage filter 210 to transmitter circuit 16. Energy storage filter 210 includes an inductor $210_2$ connected in "series" between power supply output terminal $26_{O1}$ and transmitter input power node $16i1$. A capacitor CM is connected between transmitter input power nodes $16i1$ and $16i2$.

It should be noted that the terms "between," "across," and other terms such as "parallel" have meanings in an electrical context which differ from their meanings in the field of mechanics or in ordinary parlance. More particularly, the term "between" in the context of signal or electrical flow relating to two separate devices, apparatuses or entities does not relate to physical location, but instead refers to the identities of the source and destination of the flow. Thus, flow of signal "between" A and B refers to source and destination, and the flow itself may be by way of a path which is nowhere physically located between the locations of A and B. The term "between" can also define the end points of the electrical field extending "across" or to points of differing voltage or potential, and the electrical conductors making the connection need not necessarily lie physically between the terminals of the source. Similarly, the term "parallel" in an electrical context can mean, for digital signals, the simultaneous generation on separate signal or conductive paths of plural individual signals, which taken together constitute the entire signal. For the case of current, the term "parallel" means that the flow of a current is divided to flow in a plurality of separated conductors, all of which are physically connected together at disparate, spatially separated locations, so that the current travels from one such location to the other by plural paths, which need not be physically parallel.

In addition, discussions of circuits necessarily describe one element at a time, as language is understood in serial time. Consequently, a description of two interconnected elements may describe them as being in "series" or in "parallel," which will be true for the two elements described. However, further description of the circuit may implicate other interconnected devices, which when connected to the first two devices may result in current flows which contradict the "series" or "parallel" description of the original two devices. This is an unfortunate result of the limitations of language, and all descriptions herein should be understood in that context.

The term "coupled" as used herein includes electrical activity extending from one element to another element either by way of an intermediary element or in the absence of any intermediary element.

In FIG. 2, the transmitter 16 can be seen to be made up of a plurality of mutually-parallel-connected "modules" of a set 220 of modules. More particularly, set 220 of modules includes six modules designated $220_1$, $220_2$, $220_3$, $220_4$, $220_5$, and $220_6$. These modules are identical, so that a description of one suffices to explain all. All the modules of set 220 are electrically connected to energy storage filter 210 by way of a conductive bus designated 219 and the various ground connections $16i2$. The combined capacitances of capacitor CM of FIG. 2 together with the capacitances of the various capacitors C of the modules $220_1$, $220_2$, ... $220_6$ of set 220 of modules make up capacitance C30 of FIG. 1.

Taking module $220_3$ as being representative of any of the modules of set 220, each module of set 220 includes a capacitor paralleled by a resistor and also paralleled by a switched resistance. Thus, module $220_3$ includes a load resistance $220_{31}$ in series with a switching element $220_{32}$, which is illustrated as being a field-effect transistor (FET), to thereby constitute the switched resistance $220_{S2}$. The conductive state of the FET is controlled by a "strobe" (STYM) pulse signal applied from the RCC 22 of FIG. 1. The switched resistance $220_{S2}$ is connected between bus 219 and the transmitter 16 ground $16i2$. A capacitor $220_{33}$ is also coupled between bus 219 and the transmitter 16 ground $16i2$, so the capacitor is in parallel with the switched resistance $220_{S2}$. A further resistance in the form of a resistor $220_{34}$ is also coupled between bus 219 and the transmitter 16 ground $16i2$, so the resistor $220_{34}$ is in parallel with the capacitor $220_{33}$ and switched resistance $220_{S2}$.

As illustrated in FIG. 2, the value of inductor $210_2$ is 2.5 milliHenry (mH), and the value of capacitor 210C is 230 Farads (F). Resistor $220_{34}$ of module $220_3$, and other corresponding resistors, is or are continuously connected across bus 219 (between bus 219 and ground). The bus voltage is 32 volts direct (32 VDC), and the current $220_{35}$ flowing through resistor $220_{34}$ is indicated as being 5 amperes (A). Thus, resistor $220_{34}$ and the other corresponding resistors each have a value of about 6.4 ohms. The values of resistors corresponding to resistor $220_{31}$ is or are about 0.45 ohms.

Inductor $210_2$ of FIG. 2 provides an inductance of 2.5 milliHenries at an average current of many hundreds of amperes. This inductor can be as large as an office cabinet and weigh tons, and is very costly. If it should fail, replacement with a spare unit is clumsy and time-consuming. Improved radar systems and power arrangements are desired.

SUMMARY

A power supply according to an aspect of the disclosure is for energizing a load. The power supply comprises a power current source including a control input port, for sourcing a current, the magnitude of which depends upon a control voltage applied to the input port. A capacitor is coupled to the power current source and to the load, for averaging current from the power current source for thereby generating load voltage. A source of load enable signals applies load enable signals to the load. In response to the load enable signals, the load is switched between high current and low current states. A power current source current-to-voltage converter generates a voltage representative of the current of the power current source. A current controller is coupled to the control input port of the power current source for generating the power current source control voltage. The current controller is connected for comparing the voltage representative of the power current with a first reference voltage appearing across a reference capacitor, and for controlling the power current source to increase current when the voltage representative of the power current is greater than the first reference voltage across the reference capacitor. A window comparator is coupled to the power current controller and to the capacitor, for comparing first and second scaled load voltages with a second reference voltage having a value lying between upper and lower permissible values of the scaled load voltages, for, when the first scaled load voltage is greater than the second reference voltage, draining current from the reference capacitor, and for, when the second scaled load voltage is greater than the second reference voltage, charging the reference capacitor.

DESCRIPTION OF THE INVENTION

Figure 3:
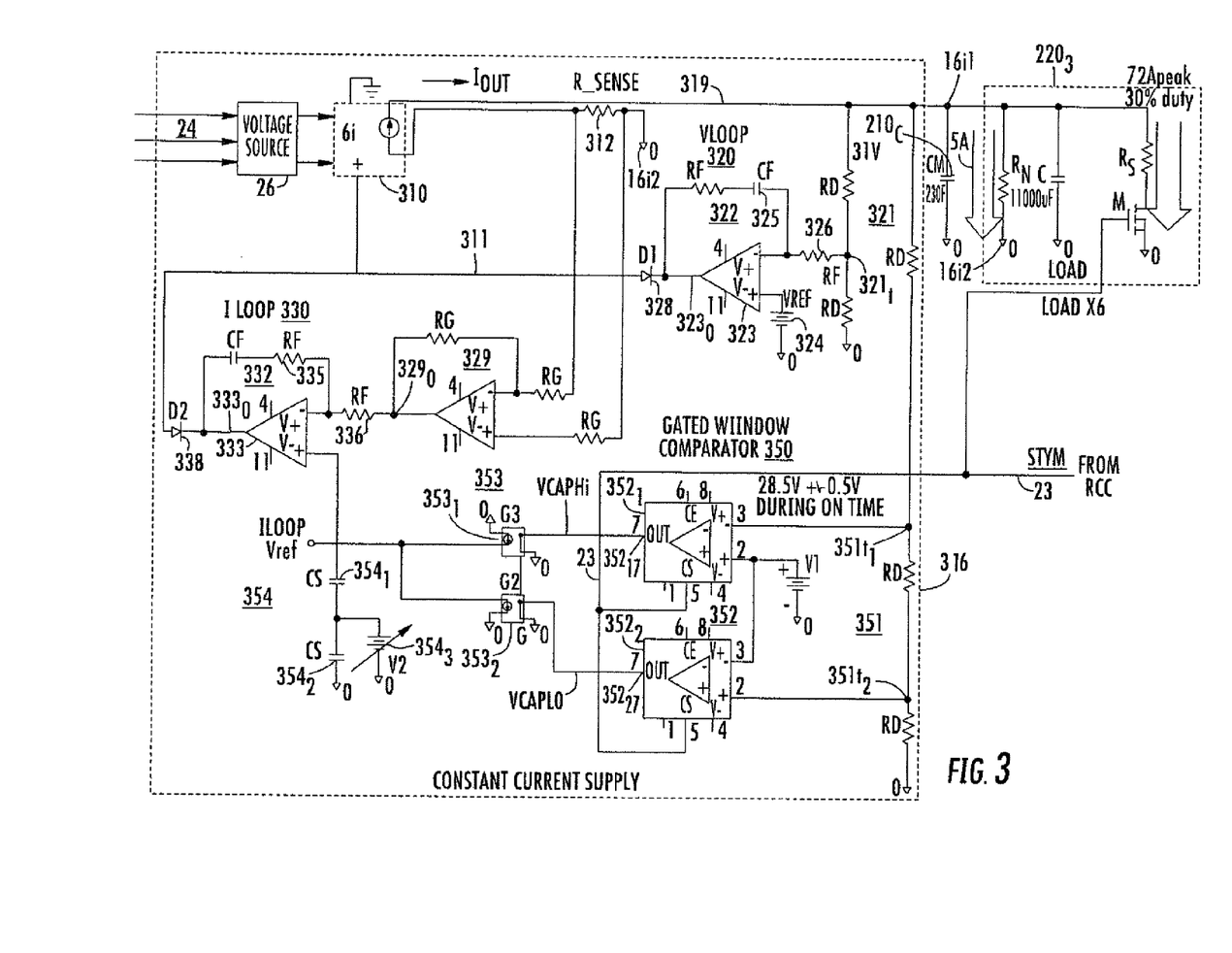
FIG. 3 is a simplified schematic diagram of a power supply according to aspects of the disclosure, which eliminates the need for the transformer of the power supply of FIG. 2.

FIG. 3 illustrates a power supply 316 according to aspects of the invention, together with one module of the load, designated $220_3$. In FIG. 3, a power supply 26 at the left produces direct voltage, which is applied to a controllable current source 310. The magnitude of the flow of current on path 319 from controllable current source 310 is controlled by control voltage applied to the control (+) input port of constant-current source 310 by way of a bus 311. The current in current source 310 flows from ground $16i2$, through a current sensing resistor (r_sense) 312 and through bus 319 to the load represented by module $220_3$, which in this case represents a plurality of such loads connected in parallel. The load $220_3$ includes a switched component $R_S$ and a non-switched component $R_N$, so the load always draws current, either maximum or minimum. The power supply circuit 26 includes a voltage control loop (VLOOP) including portions designated 320 and also includes a current control loop (ILOOP) including portions designated 330. A gated window comparator, designated generally as 350, provides additional control.

Voltage control loop 320 of FIG. 3 includes a voltage divider 321, which divides the power supply output voltage on bus 319 to produce a voltage at a tap $321_t$. The divided bus voltage is applied from tap $321_t$, by way of a resistor 326, to the inverting (−) input port of an amplifier 322 including operational amplifier 323. The inverting input port of operational amplifier 323 also receives feedback from an RC network 325. The gain of amplifier 322 is established by the values of the feedback components and input resistor 326. A reference voltage illustrated by a battery symbol 324 is connected to the noninverting (+) input port of operational amplifier 323, making it into a voltage comparator. When the divided voltage applied by voltage divider 321 to the input port of amplifier 322 is more negative than the reference voltage, the voltage at the output port $323_O$ of operational amplifier 323 tends to go positive relative to the reference voltage. When the divided voltage applied by voltage divider 321 to the inverting input port of amplifier 322 more positive than the reference voltage, the output voltage at output port $323_O$ tends to go negative relative to the reference voltage. The output voltage produced by amplifier 322 is coupled to a control bus 311 by way of a unidirectional current conduction device such as diode 328. Diode 328 is poled so that a negative voltage at output port $323_O$ tends to be coupled to bus 311, and so that voltages at the output port $323_O$ which are more positive than the voltage on bus 311 are isolated from the bus. Bus 311, in turn, is coupled to control the conduction of current source 310. Voltage control loop 320 tends to maintain a voltage of 31 volts on bus 319.

Current control loop (ILOOP) 330 of FIG. 3 includes a differential amplifier 329 having its input ports coupled to current sensing resistor 312, for generating an unbalanced current-representative signal at output port $329_O$ for application to the input resistor 336 of a controlled amplifier 332. Amplifier 332 includes an operational amplifier 333 having a degenerative feedback path 335 from its output port $333_O$ to its inverting (−) input port. The output port $333_O$ of amplifier 333 is coupled to control bus 311 by a unidirectional current conducting device 338, poled to pull bus 311 negative if the output voltage of amplifier 333 is more negative than the voltage on the noninverting (+) input port of amplifier 333. Thus, bus 311 can be pulled negative by the most negative of the voltages applied to the bus from VLOOP 320 or ILOOP 330. When bus 311 is pulled negative, the current produced by current source 310 is reduced. At initial turn-ON of the power supply, the inrush current is limited by operation of the ILOOP 330. While the inrush current charges capacitor $210_C$, VLOOP 320 is active. As the capacitor voltage reaches its desire set value, VLOOP 320 takes control by pulling bus 311 negative, which tends to reduce the current sourced by current source 310 so as to limit the current. Thus, the current of source 310 reduces as capacitor $210_C$ reaches full charge. Since the load has a finite or minimum value, it always draws some current, so the voltage loop 320 will always tend to supply some current from source 310 to the load even though capacitor $210_C$ is fully charged.

Power supply or source 316 of FIG. 3 includes Gated Window Comparator 350 for controlling the reference voltage Vref of the current loop ILOOP 330. Gated window comparator 350 includes a voltage divider 351 defining two taps $351t_1$ and $351t_2$, which scale or proportion the load voltage on bus 319. Gated window comparator 350 is enabled by the STYM signal (on bus 23) during those times in which the LOAD $220_3$ draws full current, and is disabled between such active intervals. During disabled (non-enabled) intervals, the comparators $352_1$ and $352_2$ of set 352 of comparators of gated window comparator 350 present an open circuit at their output ports $352_{17}$ and $352_{27}$, respectively.

The maximum load of LOAD $220_3$ of FIG. 3 occurs during the STYM pulse intervals, which enable the load FET M. The minimum current occurs during non-STYM-pulse intervals, during which FET M is nonconductive. The STYM pulses enable conduction of FET M, and the current through load $220_3$ increases during such periods. Gated window comparator 350 is enabled during the STYM pulses, and is disabled during non-STYM-pulse intervals. Disabling the window comparator 350 does not disable the operation of current control loop (ILOOP) 330, but controls its reference voltage ILOOP Vref.

Figure 4A:
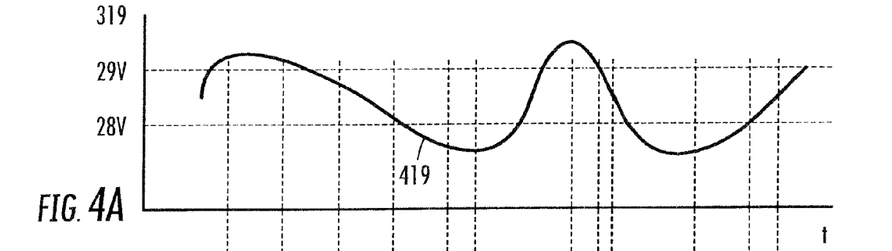
FIGS. 4A, 4B, 4C, 4D, 4E, 4F, and 4G plot voltages and signals occurring during operation of a system according to FIG. 3 to the same time frame.
Figure 4B:
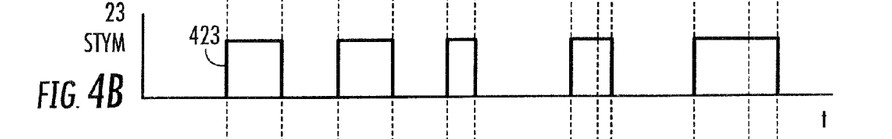
Figure 4C:
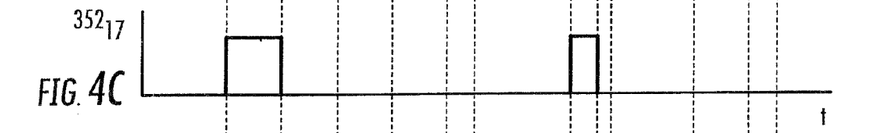
Figure 4D:
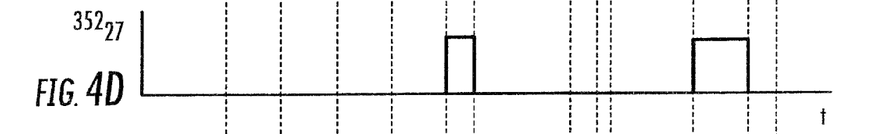
Figure 4E:
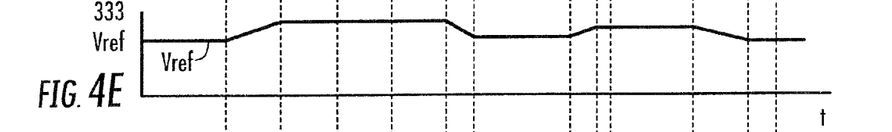
Figure 4F:
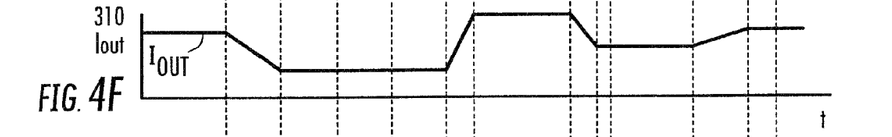
Figure 4G:
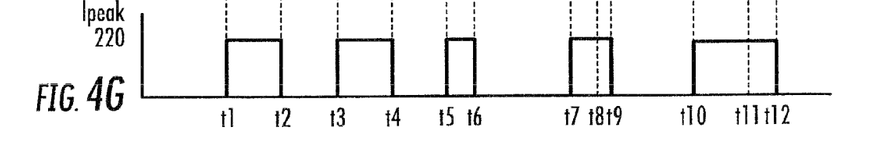

Gated window comparator 350 senses the power supply output voltage on bus or path 319 when the STYM signal on path 23 is active or logic HIGH. The active or logic HIGH state of the STYM pulse is illustrated in FIG. 4B by plot 423 in the intervals t1-t2, t3-t4, t5-t6, t7-t9, and t10-t12. FIG. 4A illustrates by a plot 419 a representative or exemplary trajectory of the output voltage of power supply 316 on bus 319 in the interval t0-t12. Beginning at time t1 and extending to time t2 of FIG. 4A, power supply output voltage 419 on bus 319 of FIG. 3 is higher (more positive) than 29V, and the STYM signal 419 of FIG. 4B is active high. With the STYM signal active high, the gated window comparator 350 is enabled. Within gated window comparator 350, comparator $352_1$ actively compares the scaled or proportioned power supply output voltage appearing at divider 351 tap point $351t_1$ with a reference voltage V1. The scaled voltage appearing at tap $351t_1$ exceeds reference voltage V1 in the interval t1-t2, so the output voltage at port $352_{17}$ and gated window comparator output $352_{17}$ is low (FIG. 4C). With the output port $352_{17}$ of comparator $352_1$ at a logic HIGH, current source $353_1$ charges composite capacitor 354 (including capacitors $354_1$ and $354_2$), as a result of which the current loop 330 reference voltage Vref is increased, as illustrated in FIG. 4D. This increases (renders more positive) the reference voltage Vref. As a result, ILOOP 330 decreases output current Iout of current source 310, as illustrated in FIG. 4F and as set forth in the Truth Table of FIG. 5. Load $220_3$ discharges capacitor $210_C$ faster and voltage 319 decreases. At time t2 the STYM signal ends and power supply 352 settles into a stable state. At time t3 a new STYM signal occurs. Output voltage 319 at time t3 is between 28V and 29V, and both gated window comparator $352_{17}$ and $352_{27}$ are inactive, as illustrated by the plots of FIGS. 4C and 4D, and as set forth in FIG. 5. Reference voltage Vref 333 and Iout 310 are held constant in the interval t3-t4 at the same values established at time t2. The next change takes place at times t5-t6, when the next STYM signal is active high. At this time Vout 319 is below 28V (FIG. 4A) and gated window comparator output $352_{27}$ is active high (FIG. 4D). Iloop reference voltage Vref will become lower, and output current Iout 310 will become higher. Higher output current will charge capacitor $210_C$, and power supply 316 output voltage on bus 319 will be driven higher. This sequence ends at time t6. V ref 333 (FIG. 4E) and Iout 310 (FIG. 4F) are kept constant until time t7. At time t7 a new STYM signal occurs and Vout 319 is above 29V. Gated window comparator output $352_{17}$ turns active high from time t7 until time t8, when output voltage 319 drops below 29V. Between times t7 and t8, Vref 333 increases (FIG. 4E) and Iout 310 decreases (FIG. 4F). Decreased output current 310 tends to drive the voltage across capacitor $210_C$ lower (less positive). Reference voltage vref for comparator 333 is constant between times t8 and t10, as is the output current 310. At time t10 a new STYM signal turns active high and a sequence of events identical to that of the time period between t5 to t6 takes place. FIG. 4G shows the pulsed load current and FIG. 4F shows the continuous power supply output current from source 310. These two graphs illustrate the point that gated window comparator 350 controls the output voltage and current against load variation, and pulse loading is not reflected into the 3 phase lines 28.

Figure 5:
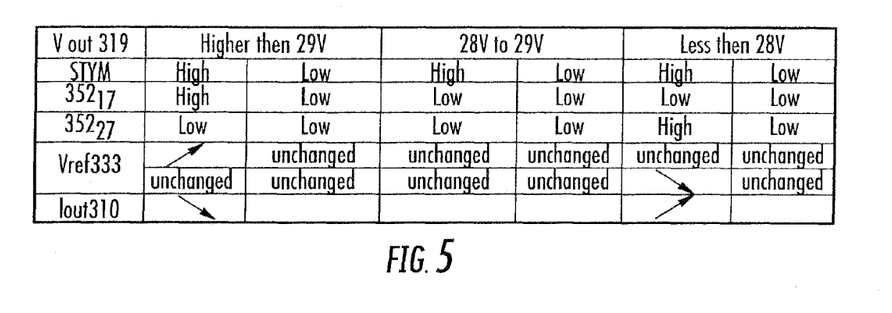
FIG. 5 is a state table listing conditions of variables in the arrangement of FIG. 3 as a function of load voltage.

The table of FIG. 5 sets forth the states of the output ports $352_{17}$ and $352_{27}$ of comparators $352_1$ and $352_2$, respectively, and of comparator 333 reference voltage vref of FIG. 3. The uppermost row of the table of FIG. 5 sets forth possible states of the load voltage on bus 319. Three states are possible, namely the bus voltage (a) is greater or higher (more positive than) than 29 volts, (b) in the range between 28 and 29 volts, and (c) less than 29 volts. Within the column for "higher than 29V," the STYM pulse that enables the high load current may be HIGH or enabling or it may be LOW or disabling. In the case in which STYM is high the voltage on bus 319 is higher than 29 volts, the states at the output ports $352_{17}$ and $352_{27}$ of comparators $352_1$ and $352_2$, respectively, are HIGH and LOW, respectively. As a result of the comparator states, the reference voltage vref for comparator 333 is increasing, and Iout of current source 310 is decreasing. Also within the column for "higher than 29V," for "STYM low," the states at the output ports $352_{17}$ and $352_{27}$ of comparators $352_1$ and $352_2$, respectively, are LOW and LOW, respectively. As a result of the comparator states, the reference voltage vref for comparator 333 is unchanged. Under the column heading "28V to 29V" of FIG. 5, when the STYM pulse is HIGH, the states at the output ports $352_{17}$ and $352_{27}$ of comparators $352_1$ and $352_2$, respectively, are LOW and LOW, respectively. As a result of the comparator states, the reference voltage vref for comparator 333 is unchanged, and the current Iout of source 310 is also unchanged. Under the column heading "28V to 29V" of FIG. 5, when the STYM pulse is LOW, the states at the output ports $352_{17}$ and $352_{27}$ of comparators $352_1$ and $352_2$, respectively, are LOW and LOW, respectively. As a result of these comparator states, the reference voltage vref for comparator 333 is unchanged, and the current Iout of source 310 is also unchanged. Under the column heading "less than 28V" of the table of FIG. 5, when the STYM pulse is HIGH, the states at the output ports $352_{17}$ and $352_{27}$ of comparators $352_1$ and $352_2$, respectively, are LOW and HIGH, respectively. As a result of the comparator states, the reference voltage vref for comparator 333 decreases, and the current Iout of source 310 increases, to tend to restore the load voltage. Under the column heading "less than 28V" of the table of FIG. 5, when the STYM pulse is LOW, the states at the output ports $352_{17}$ and $352_{27}$ of comparators $352_1$ and $352_2$, respectively, are LOW and LOW, respectively. As a result of the comparator states, the reference voltage vref for comparator 333 is unchanged, and the current Iout of source 310 is also unchanged. This operation closes a feedback loop that controls the load voltage by adjusting the current produced by source 310.

A power supply (316) according to an aspect of the disclosure is for energizing a load (220₃). The power supply (316) comprises a power current source (310) including a control input port (310+), for sourcing a current, the magnitude of which depends upon a control voltage (on bus 311) applied to the control input port (310+). A capacitor (210$_C$) is coupled to the power current source (310) and to the load (220₃), for averaging current from the power current source (310) for thereby generating load voltage. A source (23) of load enable signals (STYM) applies load enable signals to the load (220₃). In response to the load enable signals, the load is switched (M) between high current and low current states. A power current source current-to-voltage converter (312, 329) generates a voltage representative of the current of the power current source (310). A current controller (330) is coupled to the control input port (310+) of the power current source (310) for generating the power current source control voltage. The current controller (330) is connected for comparing the voltage representative of the power current with a first reference voltage (ILoop vref) appearing across a reference capacitor (354₁, 354₂), and for controlling the power current source (310) to increase current when the voltage representative of the power current is greater than the first reference voltage across the reference capacitor (354₁, 354₂). A window comparator (350, 353) is coupled to the power current controller (330) and to the capacitor (210$_C$), for comparing first (351$t_1$) and second (351$t_2$) scaled load voltages with a second reference voltage (V1) having a value lying between upper (29 v) and lower (28 v) permissible values of the scaled load voltages, for, when the first scaled load voltage (351$t_1$) is greater than the second reference voltage (V1), draining current (352₁) from the reference capacitor, and for, when the second scaled load voltage (351$t_2$) is greater than the second reference voltage (V1), charging the reference capacitor (354₁, 354₂).

What is claimed is:

1. A power supply for energizing a load, said power supply comprising:
   a power current source including a control input port, for sourcing a current, the magnitude of which depends upon a control voltage applied to the control input port of the power current source;
   a load capacitor connected to said power current source and to said load, for averaging current from said power current source for generating load voltage;
   a power current source current-to-voltage converter for generating a voltage representative of the current of said power current source;
   a current controller coupled to said control input port of said power current source for generating said power current source control voltage, said current controller being connected to a reference capacitor for comparing said voltage representative of the current with a first reference voltage appearing across said reference capacitor, and for controlling said power current source to increase current when said voltage representative of the current is greater than said first reference voltage across said reference capacitor; and
   a window comparator coupled to said current controller and to said load capacitor, for comparing a first scaled load voltage and a second scaled load voltage with a second reference voltage having a value lying between upper and lower permissible values of said scaled load voltages, for, when said first scaled load voltage is greater than said second reference voltage, draining current from said reference capacitor, and for, when said second scaled load voltage is greater than said second reference voltage, charging said reference capacitor.

2. A power supply according to claim 1, further comprising a source of load enable signals which switch said load between a high current state and a low current state,
   wherein said window comparator comprises an input coupled to said source of load enable signals, for enabling said window comparator during those intervals in which said load is enabled and for disabling said window comparator during those intervals in which said load is disabled.

3. A power supply according to claim 1, further comprising a resistor coupled across a portion of said reference capacitor for imposing a time constant on said charging and discharging of said reference capacitor.

4. A method for energizing a load switchable between high and low current consumption in response to a gating signal, said method comprising the steps of:
   sourcing a power current in response to a current magnitude control voltage applied to a control input port;
   applying said power current to a load capacitor connected to said load, for averaging current from said power current source for generating load voltage;
   generating a voltage representative of the current of said power current source;
   generating said current magnitude control voltage by comparing said voltage representative of the current of said power current source with a first reference voltage appearing across a reference capacitor, and for controlling said power current source to increase current when said voltage representative of said current of said power current source is greater than said first reference voltage across said reference capacitor; and
   comparing a first scaled load voltage and a second scaled load voltage with a second reference voltage having a value lying between upper and lower permissible values of said first and second scaled load voltages, for, when said first scaled load voltage is greater than said second reference voltage, draining current from said reference capacitor, and for, when said second scaled load voltage is greater than said second reference voltage, charging said reference capacitor.

5. A power supply for a gated load comprising:
   a power current source controlled by a current magnitude signal;
   a capacitor coupled to the power current source for integrating the power current to produce load voltage;
   a power-current-to-voltage converter coupled to the power current source for generating a sample voltage representative of the power current;
   a comparator coupled to said power current source for comparing the sample voltage with a first reference voltage appearing across a reference capacitor, for thereby controlling the current magnitude signal;
   a window comparator coupled to said comparator for charging the reference capacitor when the load voltage exceeds an upper threshold, and for discharging the reference capacitor when the load voltage is less than a lower threshold.

6. A power supply according to claim 5, wherein said window comparator is enabled by a load gating signal.

7. A power supply according to claim 5, wherein the window comparator compares a first and a second scaled load voltage with a second reference voltage having a value lying between upper and lower permissible values of said scaled load voltages, for, when said first scaled load voltage is greater than said second reference voltage, draining current from said reference capacitor, and for, when said second scaled load voltage is greater than said second reference voltage, charging said reference capacitor.

* * * * *